United States Patent [19]

Nonaka et al.

[11] Patent Number: 4,902,736
[45] Date of Patent: Feb. 20, 1990

[54] ONE-PART CURING COMPOSITION

[75] Inventors: Toshiaki Nonaka; Masashi Nakajima, both of Ichihara; Tatsuro Matsui, Funabashi; Noriaki Dokoshi, Ichihara, all of Japan

[73] Assignee: Toray Thiokol Company Limited, Tokyo, Japan

[21] Appl. No.: 243,308

[22] PCT Filed: Dec. 10, 1987

[86] PCT No.: PCT/JP87/00961
  § 371 Date: Aug. 10, 1988
  § 102(e) Date: Aug. 10, 1988

[87] PCT Pub. No.: WO88/04307
  PCT Pub. Date: Jun. 16, 1988

[30] Foreign Application Priority Data

Dec. 10, 1986 [JP] Japan ................. 61-292542

[51] Int. Cl.$^4$ ................. C08K 5/09
[52] U.S. Cl. ................. 524/296; 524/297; 524/425; 524/431; 524/495; 524/588; 524/589; 524/775; 524/783; 524/788; 524/858; 525/440; 525/446; 525/453; 525/460; 528/28; 528/30; 528/60; 528/65; 528/66; 528/76; 528/77

[58] Field of Search .............. 528/30, 28, 76, 77, 528/60, 65, 66; 525/440, 446, 460, 453; 524/425, 431, 296, 297, 495, 588, 589, 775, 783, 788, 858

[56] References Cited

U.S. PATENT DOCUMENTS 4,698,407 10/1987 Nakagima et al. ................. 528/30

Primary Examiner—Melvyn I. Marquis
Attorney, Agent, or Firm—Birch, Stewart, Kolasch & Birch

[57] ABSTRACT

A one-part curing composition comprising a compound (a) having two or more structural groups, per molecule, expressed by the general formula:

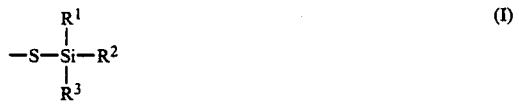

wherein $R^1$, $R^2$, and $R^3$ are groups selected from an alkyl group having 1 to 6 carbon atoms, a phenyl group, and a chloromethyl group, and a polymer (b) having two or more isocyanate groups per molecule, has a good stability in storage under conditions which exclude moisture and humidity, and which further cures in the presence of humidity. This composition does not foam under high temperatures and humidities and has a good heat resistance.

22 Claims, No Drawings

ONE-PART CURING COMPOSITION

TECHNICAL FIELD

The present invention relates to a one-part curing composition which cures in the humidity in the air, more particularly it relates to a one-part curing composition which comprises as essential constituents a compound having two or more silylthio ether bonds per molecule and a polymer having two or more isocyanate groups per molecule, which cures naturally in the humidity in the air, and which can be used as a sealing material.

BACKGROUND ART

Polymers having two or more isocyanate groups per molecule can readily polymerize by a reaction with an active hydrogen containing compound or water, and are widely used in fields such as sealing materials, caulking materials, adhesives, and paints. These isocyanate group-containing polymers are mixed with diamines, amino alcohols, glycols, polyols, etc. and are used as one-part or two-part curing compositions.

Of these, some one-part curing compositions cure in the humidity in the air by the curing mechanism of formula (1):

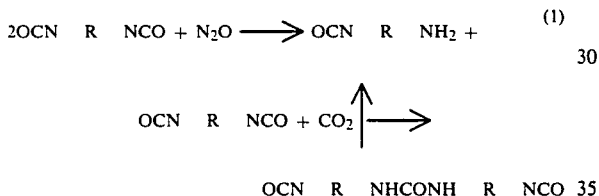

(where R is a divalent organic group).

The carbon dioxide gas produced during the curing gives rise to swelling, foaming, and gas pockets. In particular, in a one-part curing composition with a fast curing speed, gas pockets easily occur inside the cured substance or near the interface between the cured substance and the object to which it adheres, having a detrimental effect on the sealing effect and strength and the adhesion to the object. Further, there is the problem that when the cured substance is heated, foaming, and softening or embrittlement of the cured substance occurs.

To resolve these problems, various proposals have been made in the past. For example, Japanese Examined Pat. Publication (Kokoku) No. 44-2114 discloses the addition of calcium oxide to the composition so as to absorb the carbon dioxide gas produced during curing. Further, Japanese Unexamined Pat. Publication (Kokai) No. 52-17560 discloses the use of a reaction of polyalkylene ether diol and polyalkylene triol with an excess of diisocyanate polymer having equivalent isocyanate groups and the use of a polymer which blocks the remaining isocyanate groups to suppress the foaming due to carbon dioxide gas so as to provide a one-part curing composition with a fast curing no speed. Further, German Pat. No. 2,116,882, No. 2,521,841, No. 2,651,479, and No. 2,718,393 disclose methods for curing without generation of carbon dioxide gas by the addition of enamine or compounds containing an enamine group, an alidimine group, or a ketimine group.

However, the method disclosed in Japanese Examined Pat. Publication (Kokoku) No. 44-2114 suffers from the problem that the generation of carbon dioxide gas under high temperature and humidity conditions exceeds the absorption by the calcium oxide and thus it is difficult to completely prevent foaming due to the carbon dioxide gas. Further, the method disclosed in Japanese Unexamined Pat. Publication (kokai) No. 52-17560 has the defect that foaming occurs under high temperature and humidity conditions and further that the usable isocyanate containing polymers are limited. Further, in the methods disclosed in German Pat. No. 2,116,882, No. 2,521,841, No. 2,651,479, No. 2,718,393, the active hydrogen-containing compounds used are limited to amines and the curing speed is slow. Further, the softening or embrittlement of the cured substance upon high temperature heating is considered to derive from the urethane bonds or urea bonds in the cured substance and, in the case of the use of polyamines or polyols as curing agents, improvement is difficult.

DISCLOSURE OF THE INVENTION

An object of the present invention is to provide a one-part curing composition which avoids foaming due to carbon dioxide gas, and the problems in conventional one-part curing compositions using isocyanate-containing polymers as basic components, and enables curing by a curing mechanism free from generation of carbon dioxide gas.

Another object of the present invention is to provide a one-part curing composition free from foaming under high temperature and humidity conditions, with a fast curing speed even at low temperature, and with superior heat resistance.

The present invention provides a one-part curing composition comprising (a) a compound having two or more structural groups, per molecule, expressed by the general formula:

wherein, $R^1$, $R^2$, and $R^3$ are groups selected from an alkyl group having 1 to 6 carbon atoms, phenyl group, and chloromethyl group, and (b) a polymer having two or more isocyanate groups per molecule.

DESCRIPTION OF THE PREFERRED EMBODIMENTS

When $R^1$, $R^2$, and $R^3$ in the general formula (I) are alkyl groups, each alkyl group preferably has one to two carbon atoms. Further, the structural group of the general formula:

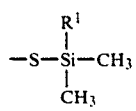

is more preferable because the materials are readily available and the rate of reaction with water is fast. In particular, in the above formula, it is preferable that $R^1$ is a methyl group.

The structural group of general formula (I) hydrolyzes due to the moisture in the air to be thereby converted to a thiol group containing active hydrogen.

Compound (a) having the structural group of general formula (I) preferably has a molecular weight of 200 to 10,000, particularly 300 to 3,000. If the molecular weight is less than 200, the hydrolysis speed is strikingly fast, so handling of the compound becomes difficult and, further, the storage stability of the composition declines. Further, when the molecular weight is over 10,000, the hydrolysis speed becomes slower and the curing speed of the composition becomes slower. Compound (a) preferably is in a liquid state at 20° C.

As the compound (a) with two or more structural groups expressed by general formula (I) per molecule, there is, for example, the following:

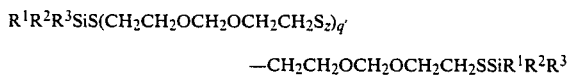

$R^1R^2R^3SiS(CH_2CH_2OCH_2OCH_2CH_2S_z)_{q'}$
$-CH_2CH_2OCH_2OCH_2CH_2SSiR^1R^2R^3$ where q' is an integer from 0 to 25, and z is an integer from 1 to 4, the mean value of which is about 2.

A polymer with a q' of over 25 is not preferable since it has poor compatibility with isocyanate group-containing polymers, in particular urethane prepolymers having skeletons of polyether or polyester.

Among the compounds, particularly preferable is $(CH_3)_3SiS(CH_2CH_2OCH_2OCH_2CH_2S_2)_r$
$-CH_2CH_2OCH_2OCH_2CH_2SSi(CH_3)_3$ where r is an integer of from 0 to 10.

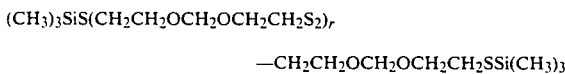

$R^1R^2R^3SiS+R^5-O+_sR^6SSiR^1R^2R^3$ where $R^5$ and $R^6$ are alkylene groups with two or three carbon atoms and s is an integer from 0 to 50;

This is preferable since it has good compatibility with urethane prepolymers.

In addition, the following compounds are suitable as the compound (a):

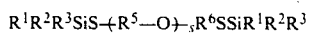

$R^1R^2R^3SiS(CH_2)_6SCH_2CH_2(OCHR^4CH_2S-CH_2CH_2)_m$
$-CH_2CH_2CH_2CH_2SSiR^1R^2R^3$ where m is an integer from 0 to 25 and $R^4$ is hydrogen or a methyl group,

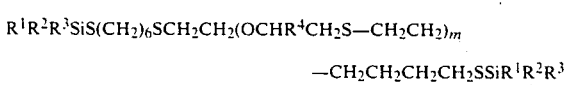

$R^1R^2R^3SiSCH_2COOCH_2C$
$-(CH_2OCOCH_2SSiR^1R^2R^3)_3$, and
$(R^1R^2R^3SiSCH_2CH_2COOCH_2)_3C_2H_5$ Of course, the compound (a) mixed in the one-part curing composition of the present invention may be one or two types or more.

The compound having two or more structural groups of the general formula (I) in a molecule may be synthesized by causing a reaction of a commercially available silylation reagent etc. with a known compound having two or more thiol groups in a molecule to convert the thiol groups to trialkylsilylthio groups.

Here, as the known compound having thiol groups used as the raw material, mention may be made of the liquid polysulfide polymer disclosed in the specification of U.S. Pat. No. 2,466,963, but a compound with the structure expressed by the general formula:

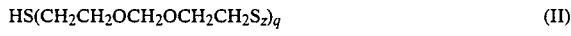

$HS(CH_2CH_2OCH_2OCH_2CH_2S_z)_q$ (II)
$-CH_2CH_2OCH_2OCH_2CH_2SH$ where, in the formula, q is an integer from 1 to 25, preferably 1 to 10, and z is an integer from 1 to 4, with a mean value of about 2, or $HS \cdot CH_2CH_2OCH_2OCH_2CH_2CH_2SH$ (II')

is preferable.

Further, the polysulfide compound expressed by general formula (II) sometimes has introduced therein a small amount of a crosslinking agent in its synthesis stage and a unique structure derived from the crosslinking agent may be present in the skeleton. Further, in addition to the disulfide bonds shown in general formula (II), it is possible for a small amount of monosulfide bonds, trisulfide bonds and tetrasulfide bonds to be present, but the mean value of the number of sulfur atoms is two so they are shown by disulfide bonds.

Further, as other known compounds, mention may be made, for example, of polyoxyalkylenepolyol disclosed in Japanese Examined Pat. Publication (Kokoku) No. 47-48,279 and having the structure shown by general formula (III), polymercaptan disclosed in the specification of U.S. Pat. No. 4,092,293 and having the structure shown by general formula (IV), mercaptanterminated liquid polymers having

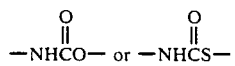

at least in part of the skeleton, for example a mercaptan terminated liquid polymer disclosed in the specification of U.S. Pat. No. 3,923,748 and having a urethane group-containing structure expressed by general formula (V), a liquid polythioether disclosed in the specification of U.S. Pat. No. 4,366,307 and having the structure expressed by general formula (VI), which has mercaptan terminals, a poly(oxyalkylene)-polyester-poly(monosulfide)-polythiol disclosed in Japanese Examined Pat. Publication (Kokoku) No. 52-34,677, the butadiene mercaptan polymer disclosed in the specification of U.S. Pat. No. 3,282,901, the mercaptancontaining polymers disclosed in the specification of U.S. Pat. No. 3,523,985, and the mercapto-organopolysiloxane disclosed in Japanese Examined Pat. Publication (Kokoku) No. 55-39,261, Japanese Examined Pat. Publication (Kokoku) No. 60-3,421, etc. It is possible to use these as a materials.

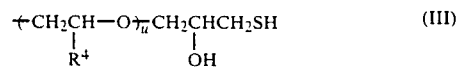

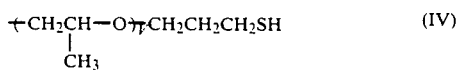

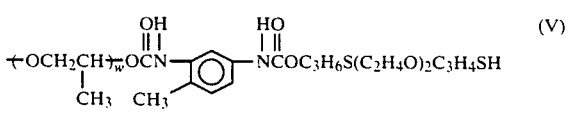

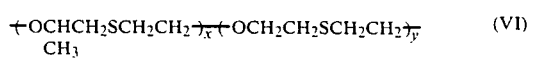

wherein, u, v, w, x, and y are integers from 2 to 100 and $R^4$ is hydrogen or a methyl group.

Further, as other thiol group-containing compounds, there are known polymers such as $HS(CH_2CH_2O)SCH_2CH_2SH$ wherein s is an integer of from 0 to 50, and monomers such as

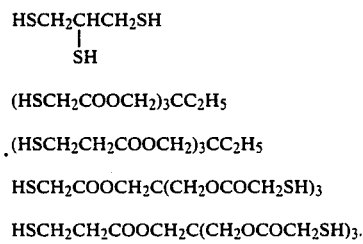

As a method for converting the thiol groups included in these known thiol group-containing compounds into trialkylsilyl groups, it is possible to cause a reaction between halogenosilanes, expressed by the general formula:

$$R^1R^2R^3SiX \quad (VII)$$

of an equal molar amount or more of the thiol groups included in the raw material compound and triethylamine.

$R^1$, $R^2$, and $R^3$ in general formula (VII) are as explained previously and X expresses a halogen atom. As specific examples of these halogenosilanes, there are trimethylchlorosilane, trimethylbromosilane, trimethyliodosilane, dimethylphenylchlorosilane, chloromethyldimethylchlorosilane, etc., but from the reactivity with thiol groups, the ease of removal of by-products, and economy, trimethylchlorosilane is particularly preferable. Further, as the method for converting the thiol groups included in the known thiol group-containing polymers, mentioned above, into trimethylsilylthio groups, it is possible to cause a reaction of N,O-bis(-trimethylsilyl)acetoamide or N,N'-bis(trimethylsilyl-)urea, in an amount one-half a mole or more, with respect to the thiol groups included in the raw material compound.

Further, as the method for converting the thiol groups in the known compound to trimethylsilylthio groups, it is possible to cause a reaction, under the presence of a suitable reaction catalyst, of one-half a mole or more, preferably an equimolar amount to three mole amount, of hexamethyldisilazane, with respect to the thiol groups included in the compound. As the reaction catalyst, use may be made of substances described in J. Org. Chem., 47, 3966 (1982), but of these it is particularly preferably to use 0.001 to 0.1 equivalent of imidazole or saccharin with respect to the raw material compound.

Even when using one of the above-mentioned methods for converting thiol groups to trialkylsilylthio groups, a large excess of a silylating agent is needed when the known raw material compound includes, in addition to thiol groups, hydroxyl groups, amino groups, and other functional groups, which are reactable with silylating agents, and when, for the raw material, use is made of a compound having the structure of general formula (III) and (V). This is not preferable procedure-wise or economically.

Next, as the isocyanate group-containing polymer of the component (b) of the present invention, use may be made of commercially available polyester type urethane prepolymers, polyether type urethane prepolymers, etc., but of these, particularly preferable is a polymer with a molecular weight of 500 to 20,000 including two or more isocyanate groups at the terminals. More preferable is one of 2000 to 8000. With a molecular weight under 500, the reactivity of the isocyanate groups rises and the storage stability deteriorates. Further, foaming easily occurs. Further, when over 20,000, the reactivity of the isocyanate is low and the curing ability declines.

These isocyanate group-containing polymers may be obtained as reaction products of organic polyisocyanates with active hydrogen-containing compounds.

As examples of active hydrogen-containing compounds, there are hydroxyl-terminated polyester, polyhydroxypolyalkyleneether, hydroxyl-terminated polyurethane polymers, polyvalent polythioether, polyacetal, aliphatic polyol; alkane, alkene, alkin, and other aliphatic thiols with two or more SH groups; diamines including aromatic, aliphatic, heterocyclic diamines, etc.; and mixtures of the same.

Further, as examples of organic polyisocyanates, there are diisocyanates such as m-phenylenediisocyanate, toluene-2,4-diisocyanate, hexamethylene-1,6-diisocyanate, tetramethylene-1,4-diisocyanate, cyclohexane-1,4-diisocyanate, naphthalene-1,5-diisocyanate, 1-methoxyphenyl-2,4-diisocyanate, diphenylmethane-4,4-diisocyanate, and 4,4'-biphenylenediisocyanate; triisocyanates such as 4,4',4''-triphenylmethanetriisocyanate, and toluene-2,4,6-triisocyanate; and tetraisocyanate such as 4,4'-dimethyldiphenylmethane-2,2', 5,5,-tetraisocyanate. These may be used alone or in the form of a mixture.

Further, in the present invention, regarding the mixing ratio of the compound (a) and the polymer (b), the molar ratio of the structural groups of general formula (I) to the isocyanate groups is 0.3 to 2.0, preferably 0.8 to 1.2.

When the molar ratio of the structural groups of general formula (I) to the isocyanate groups is less than 0.3, the crosslinking points increase, the cured product becomes harder, and the elongation declines. Further, the residual isocyanate groups in the cured product become a cause of foaming.

When the molar ratio of the structural groups of general formula (I) to the isocyanate groups is over 2.0, the compound with the structural groups of general formula (I) behaves as a terminal short-stopping agent and strikingly interferes with the polymerization of the composition, so this is not desirable.

To reduce the cost and improve the handling property of the composition and the physical properties of the cured product, the composition of the present invention may have added thereto, in addition to the above-mentioned two essential components, fillers such as calcium carbonate, carbon black, and titanium oxide, and plasticizers such as butylbenzyl phthalate, and dioctyl phthalate.

However, to obtain a one-part curing composition with a superior storage stability, it is preferable to use, fully dehydrated fillers and plasticizers, which are free from hydroxyl groups, amino groups, thiol groups, and other functional groups and do not have striking acidity or alkalinity.

Further, the composition of the present invention may have added thereto a powdered molecular sieve with the aim of enhancing the storage stability.

Further, the composition of the present invention preferably has added thereto a catalyst for ensuring rapid and reliable curing after application. As the catalyst, there are reaction catalysts between the thiol groups which are formed by hydrolysis of the structural groups of general formula (I) due to the humidity in the air, and the isocyanate groups, and catalysts capable of hydrolyzing the structural groups of general formula (I).

As the former reaction catalysts, use may be made of tertiary amine catalysts such as triethylenediamine, triethylamine, pentamethylenediethylenetriamine, N,N-dimethylcyclohexylamine, and N,N-dicyclohexylmethylamine; and metal catalysts, primarily organomethallic catalysts such as dibutyltin diacetate, dibutyltin dilaurate, dibutyltin dimalate, and lead octenate.

The amount of these catalysts used differs according to the molecular weight and structure of the compound (a) and polymer (b), but preferably addition is made of 0.01 to 1.0 part by weight, particularly preferably 0.1 to 0.3 part by weight, per 100 parts by weight of the compound (a) and polymer (b). With less than 0.01 part by weight, the curing speed of the composition declines, so this is not preferable. Further, over 1.0 part by weight, there is an adverse effect on the storage stability of the composition, so this too is not preferable.

Further, as the latter hydrolysis catalyst for the structural groups of general formula (I), use may be made in general of amines. As these amines, tertiary amines are particularly preferable. For example, triethylamine, tripropylamine, tributylamine, pyridine, N-methyl-2-pyrrolidone, dimethylaniline, benzyldimethylamine, hexamethylenetetramine, 2,4,6-trisdimethylaminomethylphenol, and diphenylguanidine, among which hexamethylenetetramine and 2,4,6-trisdimethylam.noi methylphenol, and diphenylguanidine are preferable as they lack volatility.

The amount of amines used is preferably 0.01 to 3.0 parts by weight per 100 parts by weight of the compound of component (a). When over 3.0 parts by weight, the storage stability deteriorates and when under 0.01 part by weight, the hydrolysis does not progress, so these are not preferable.

The composition of the present invention contains a compound having two or more structural groups per molecule, inert to an isocyanate group, expressed by general formula (I) and a polymer having two or more isocyanate groups per molecule, so in a state shut out from moisture and humidity, storage stability as a one-part curing composition is imparted.

Further, in the present composition, the structural groups of general formula (I) of the composition easily hydrolyze due to the humidity in the air, as shown in formula (2), thereby to be converted to thiol groups. The produced thiol groups react with the polymer with the isocyanate groups as shown by formula (3) and polymerize to cure. That is, the composition of the present invention can be used as a one-part curing composition.

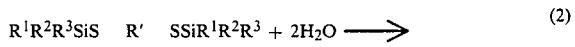  (2)

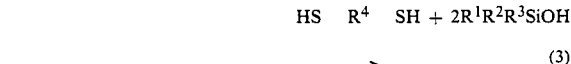

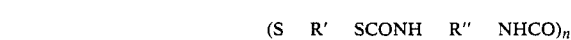  (3)

(R', R" are organic groups)

Below, an explanation will be given of synthesis examples of the compound (a) having structural groups shown by general formula (I) and examples of the one-part curing composition of the present invention.

SYNTHESIS EXAMPLE 1

A 500 g amount (0.5 mole) of a liquid polysulfide expressed by

(made by Toray Thiokol Co., Thiokol LP-3), 161 g (1.0 mole) of hexamethyldisilazane, 0.5 g (0.0024 mole) of saccharin, and 50 g of dichloroethane were charged into a 1 liter capacity reactor provided with a condenser and a stirrer, heated to 120° C., and stirred for 5 hours. Vacuum distillation was carried out to remove the dichloroethane, and excess hexamethyldisilazane and by-products and obtain the polymer shown by the following structural formula:

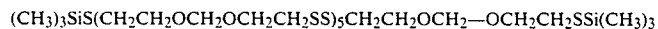

SYNTHESIS EXAMPLE 2

A charge composed of 182 g (1.0 mole) of triethylene glycol dimercaptan expressed by the formula:

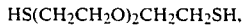

322 g (2.0 mole) of hexamethyldisilazane, 1.0 g (0.005 mole) of saccharin, and 50 g of dichloroethane was treated in the same way as Synthesis Example 1 to obtain the compound shown by the following structural formula:

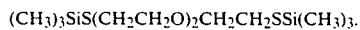

SYNTHESIS EXAMPLE 3

A charge composed of 216 g (0.5 mole) of pentaerythritol tetrathioglycolate expressed by the formula:

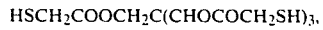

322 g (2.0 mole) of hexamethyldisilazane, 1.0 g (0.005 mole) of saccharin, and 50 g of dichloroethane was treated in the same way as Synthesis Example 1 to obtain the compound shown by the following structural formula:

A catalyst, a filler, a plasticizer, and a molecular sieve were incorporated with each of the compounds containing two or more structural groups of the general formula (I) obtained in the synthesis examples and a commercially available isocyanate group-containing polymer to obtain the composition of the present invention, and its performance was evaluated. As the commercially available isocyanate group-containing polymer, use was made of three types of polymers (Sanprene SEL-No. 3, No. 23, and No. 25) of Sanyo Chem. Ind. Ltd., with a PPG skeleton terminated with tolylene diisocyanate (TDI), alone or in mixture.

| Product name | Viscosity (CSP/30° C.) | NCO (%) |
|---|---|---|
| Sanprene SEL No. 3 | 7000 | 3.6 |
| Sanprene SEL No. 23 | 5000 | 3.2 |
| Sanprene SEL No. 25 | 9000 | 2.2 |

EXAAMPLE 1

A paste of the composition shown in Table 1 (PM-1) was prepared by heating, drying, and mixing under reduced pressure. A 45 parts by weight of the polymer obtained in Synthesis Example 1 and 100 parts by weight of Sanprene SEL No. 3 were heated at 60° C. for 20 minutes and then stirred to obtain a polymer composition (1). The polymer composition was mixed together in a nitrogen stream so as to prevent the moisture into the system.

TABLE 1

| Formulation of PM-1 | |
|---|---|
| Ingredients | Parts by weight |
| $CaCO_3$ | 140 |
| Butylbenzyl phthalate | 85 |
| Powdered molecular sieve | 4 |

The following evaluation was carried out using the composition obtained by mixing under reduced pressure at room temperature 300 parts by weight of PM-1 with 100 parts by weight of the polymer composition (1) obtained above.

The degree of the storage stability of the composition was considered in terms of the time after sealing air tightly the mixture in a tube until the mixture became viscous or solidified, at various temperatures, making extrusion impossible.

Using this composition a one-sided bead of a width of 12 mm and a depth of 15 mm was prepared. This was exposed to various temperatures and humidities and cut after fixed intervals. The thickness of the cured portion from the surface (in units of mm) was measured and used as the degree of curability.

Further, the composition was allowed to stand at 20° C. under a relative humidity of 55 percent and the tack-free time measured. The tack-free time (TF) means the time until the composition formed a film on its surface and the tackiness of the film was lost. The results are shown in Table 3.

EXAMPLE 2

A charge composed of 36 parts by weight of the polymer obtained in Synthesis Example 1 and 100 parts by weight of Sanprene SEL No. 3 was heated at 60° C. for 20 minutes with stirring, then added with 0.1 part by weight of triethylamine, then further heated at 60° C. for 20 minutes with stirring to obtain a polymer composition (2). The polymer composition (2) was mixed together in a nitrogen stream so as to prevent the moisture into the system.

A 100 parts by weight amount of the polymer composition (2) and 300 parts by weight of the PM-1 of Table 1 were mixed to obtain a composition which was used for measurement of the storage stability, curability, and TF in the same way as Example 1. The results are shown in Table 3.

EXAMPLE 3

A charge composed of 45 parts by weight of the polymer obtained in Synthesis Example 1 and 100 parts by weight of Sanprene SEL No. 3 was heated at 60° C. for 20 minutes with stirring, then added with 0.1 part by weight of N,N-dimethylcyclohexylamine, then further heated at 60° C. for 20 minutes with stirring to obtain a polymer composition (3). The polymer composition (3) was mixed together in a nitrogen stream so as to prevent the moisture into the system.

A 100 parts by weight amount of the polymer composition (3) and 300 parts by weight of the PM-1 shown in Table 1 were mixed to obtain a composition which was used for measurement of the storage stability, curability, and TF in the same way as Example 1. The results are shown in Table 3.

EXAMPLE 4

A charge composed of 45 parts by weight of the polymer obtained in Synthesis Example 1 and 100 parts by weight of Sanprene SEL No. 3 were heated at 60° C. for 20 minutes with stirring, then added with 0.1 part by weight of triethylamine and 0.1 part by weight of diphenylguanidine, then further heated at 60° C. for 20 minutes and stirred to obtain a polymer composition (4). The polymer composition (4) was mixed together in a nitrogen stream so as to prevent entry of moisture into the system.

A 100 parts by weight amount of the polymer composition (4) and 300 parts by weight of the PM-1 shown in Table 1 were mixed to obtain a composition which was used for measurement of the storage stability, curability, and TF in the same way as Example 1. The results are shown in Table 3.

EXAMPLE 5

A charge composed of 32 parts by weight amount of the polymer obtained in Synthesis Example 1 and 100 parts by weight of Sanprene SEL No. 23 were heated at 60° C. for 20 minutes with stirring, then added with 0.1 part by weight of triethylamine, then further heated at 60° C. for 20 minutes and stirred to obtain a polymer composition (5). The polymer composition (5) was mixed together in a nitrogen stream so as to prevent entry of moisture into the system.

A 100 parts by weight amount of the mixed polymer (5) and 300 parts by weight of the PM-1 shown in Table 1 were mixed to obtain a composition which was used for measurement of the storage stability, curability, and TF in the same way as Example 1. The results are shown in Table 3.

EXAMPLE 6

A charge composed of 48 parts by weight of the polymer obtained in Synthesis Example 1, 100 parts by weight of Sanprene SEL No. 23, 25 parts by weight of Sanprene No. 25, plus 0.16 part by weight of triethylamine was treated by the same procedure as in Example 2 to obtain a polymer composition (6). A 100 parts by weight amount of the mixed polymer composition (6) and 300 parts by weight of the PM-1 shown in Table 1 were mixed to obtain a composition which was used for measurement of the storage stability, curability, and TF in the same way as Example 1. The results are shown in Table 3.

EXAMPLE 7

A paste of the composition shown in Table 2 (PM-2) was prepared by heating and drying under reduced pressure.

A charge composed of 38 parts by weight of the polymer obtained in Synthesis Example 1, 100 parts by weight of Sanprene SEL No. 23, 25 parts by weight of Sanprene No. 25, plus 0.16 part by weight of triethylamine was treated by the same procedure as in Example 2 to obtain a polymer composition (7). A 100 parts by weight amount of the polymer composition (7) and 300 parts by weight of the PM-2 shown in Table 2 were mixed to obtain a composition which was used for measurement of the storage stability, curability and TF in the same way as Example 1. The results are shown in Table 3.

TABLE 2

| Formulation of PM-2 | |
|---|---|
| Mixture | Parts by weight |
| $CaCO_3$ | 145 |
| Dioctyl phthalate | 80 |
| Powdered molecular sieve | 4 |

Further, the composition was used for measurement of the tensile properties according to JIS A-5758 (physical property measurement method A). The results are shown in Table 4.

Further, the composition was used for measurement of the tensile properties at a pulling speed of 500 mm/min according to ASTM 638-84 TYPE IV (physical property measurement method B). The results are shown in Table 5.

EXAMPLE 8

A charge composed of 39 parts by weight of the polymer obtained in Synthesis Example 1, 100 parts by weight of Sanprene SEL No. 3, and 0.1 parts by weight of triethylamine was treated by the same procedure as in Example 2 to obtain a polymer composition (8). A 100 parts by weight amount of the polymer composition (8) and 300 parts by weight of the PM-1 shown in Table 1 were mixed to obtain a composition which was used to prepare samples for measurement of physical properties in the same way as Example 7. Then, after aging, the tensile properties were measured according to the physical property measurement method A. The results are shown in Table 4.

EXAMPLE 9

A charge composed of 39 parts by weight of the polymer obtained in Synthesis Example 1, 100 parts by weight of Sanprene SEL No. 3, and 0.1 part by weight of triethylamine was treated by the same procedure as in Example 2 to obtain a polymer composition (9). A 100 parts by weight amount of the polymer composition (9) and 300 parts by weight of the PM-1 shown in Table 1 were mixed to obtain a composition which was used for measurement of tensile properties in the same way as Example 8. The results are shown in Table 4.

EXAMPLE 10

A charge composed of 49 parts by weight of the polymer obtained in Synthesis Example 1, 100 parts by weight of Sanprene SEL No. 3, and 0.1 part by weight of triethylamine was treated by the same procedure as in Example 2 to obtain a polymer composition (10).

A 100 parts by weight amount of the mixed polymer composition (10) and 300 parts by weight of the PM-1 shown in Table 1 were mixed to obtain a composition which was used for measurement of tensile properties in the same way as Example 8. The results are shown in Table 4.

EXAMPLE 11

A charge composed of 59 parts by weight of the polymer obtained in Synthesis Example 1, 100 parts by weight of Sanprene SEL No. 3, and 0.1 part by weight of triethylamine was treated by the same procedure as in Example 2 to obtain a polymer composition (11).

A 100 parts by weight amount of the polymer composition (11) and 300 parts by weight of the PM-1 shown in Table 1 were mixed to obtain a composition which was used for measurement of tensile properties in the same way as Example 8. The results are shown in Table 4.

EXAMPLE 12

A charge composed of 15 parts by weight of the polymer obtained in Synthesis Example 1, 100 parts by weight of Sanprene SEL No. 23, 25 parts by weight of Sanprene No. 25, plus 0.16 part by weight of triethylamine was treated by the same procedure as in Example 2 to obtain a polymer composition (12). A 100 parts by weight amount of the polymer composition (12) and 300 parts by weight of the PM-1 shown in Table 1 were mixed to obtain a composition which was used for measurement of the storage stability, curability, and TF in the same way as Example 1. The results are shown in Table 3.

EXAMPLE 13

A charge composed of 15 parts by weight of the polymer obtained in Synthesis Example 3, 100 parts by weight of Sanprene SEL No. 23, 25 parts by weight of Sanprene No. 25, plus 0.16 part by weight of triethylamine was treated by the same procedure as in Example 2 to obtain a polymer composition (13). A 100 parts by weight amount of the polymer composition (13) and 300 parts by weight of the PM-1 shown in Table 1 were mixed to obtain a composition which was used for measurement of the storage stability, curability, and TF in the same way was Example 1. The results are shown in Table 3.

COMPARATIVE EXAMPLE 1

To 100 parts by weight of Sanprene SEL No. 3 was added 0.1 part by weight of triethylamine and the mixture treated by the same procedure as in Example 2 to obtain a polymer composition (14). A 100 part by weight amount of the polymer composition (14) and 300 parts by weight of the PM-1 shown in Table 1 were mixed to obtain a composition which was used for measurement of the storage stability and curability in the same way as Example 1. The results are shown in Table 3.

COMPARATIVE EXAMPLE 2

To 100 parts of weight of Sanprene SEL No. 23 was added 0.1 parts by weight of triethylamine and the mixture treated by the same procedure as in Comparative Example 1 to obtain a composition which was used for measurement of the storage stability and curability in the same way as Example 1. The results are shown in Table 3.

COMPARATIVE EXAMPLE 3

To 100 parts by weight of Sanprene SEL No. 25 was added 0.1 part by weight of triethylamine and the mixture treated by the same procedure as in Comparative Example 1 to obtain a composition which was used for measurement of the storage stability and curability in the same way as Example 1. The results are shown in Table 3.

COMPARATIVE EXAMPLE 4

A commercially available one-part urethane sealant (made by Auto Chem. Ind. CO., Auton Sealer 101A) was used for measurement of the storage stability, curability, and TF in the same way as Example 1. Further, the physical properties of the cured substance and the physical properties after heating were measured in the same way as Example 8, the results of which are shown in Table 3 and Table 5. There were no problems in the physical properties of the cured substance and the physical properties after heating, but the curing speed was slow and thus inferior.

TABLE 5-continued

| Aging conditions and measurement items | Ex. 7 | Comp. Ex. 4 |
| --- | --- | --- |
| 200% Modulus (kg/cm$^2$) | 6.5 | 7.2 |
| 300% Modulus (kg/cm$^2$) | 7.8 | 10.3 |
| Breaking strength (kg/cm$^2$) | 14.7 | 19.8 |
| Elongation (%) | 730 | 930 |
| 20° C., 55% RH × 3 days + heating (90° C.) × 14 days | | |
| 100% Modulus (kg/cm$^2$) | 4.2 | 4.2 |
| 200% Modulus (kg/cm$^2$) | 6.8 | 6.4 |
| 300% Modulus (kg/cm$^2$) | 7.9 | 9.0 |
| Breaking strength (kg/cm$^2$) | 16.0 | 16.1 |
| Elongation (%) | 800 | 950 |

Measurement temperature 20° C.

CAPABILITY OF EXPLOITATION IN INDUSTRY

The composition of the present invention comprises a compound (a) having two or more structural groups expressed by general formula (I) per molecule and a polymer (b) having two or more isocyanate groups per molecule, so is provided with both stability in storage and curing ability after application and is superior as a one-part curing composition. Further, the composition of the present invention can make use of all sorts of urethane polymers. Further, the composition of the present invention does not foam even under high temperature and humidity conditions where the curing speed is fast and, further, resolves the problems of postheating foaming, changes in physical properties, etc. which plagued the conventional one-part and two-part urethane cured substances thus enabling acquisition of a cured substance superior in heat resistance. Further, the addition of a suitable catalyst gives it a superior curability even under low temperature conditions.

The composition of the present invention is useful as a sealing material, caulking material, paint, adhesive, etc.

We claim:

1. A one-part curing composition comprising:
   (a) a compound having two or more structural groups, per molecule, expressed by the general formula:

TABLE 3

| | Ex. 1 | Ex. 2 | Ex. 3 | Ex. 4 | Ex. 5 | Ex. 6 | Ex. 7 | Ex. 12 | Ex. 13 | C. Ex. 1 | C. Ex. 2 | C. Ex. 3 | C. Ex. 4 |
| --- | --- | --- | --- | --- | --- | --- | --- | --- | --- | --- | --- | --- | --- |
| Storage stability | | | | | | | | | | | | | |
| 50° C. (days) | — | 3 | 4 | — | 4 | 15 | 4 | More than 30 | 3 | — | — | — | — |
| 35° C. | 60 | 4 | 10 | 60 | 20 | 60 | | | 10 | — | — | — | — |
| 20° C. | More than 200 | | | More than 200 | More than 100 | More than 200 | | | | — | — | — | — |
| Curability | | | | | | | | | | | | | |
| 20° C., 55% RH | | | | | | | | | | | | | |
| 1 day* | — | — | — | — | — | — | — | 1.4 | 3.0 | Foamed | Foamed | Foamed | 1.0 |
| 2 days | — | — | — | — | — | 3.3 | 2.3 | 3.1 | 4.5 | | | | 2.0 |
| 3 days | 3.0 | 4.1 | 6.0 | 8.0 | 3.4 | 3.7 | 2.9 | 4.2 | 5.6 | | | | 2.8 |
| 10° C., 40% RH | | | | | | | | | | | | | |
| 3 days | 1.0 | — | — | — | — | 2.1 | 1.7 | 2.6 | 3.6 | Foamed | Foamed | Foamed | 1.0 |
| 5 days | 1.8 | 2.8 | 4.5 | 4.2 | 2.6 | — | — | — | — | | | | 1.2 |
| 7 days | 3.0 | 3.8 | 5.3 | 5.1 | 3.4 | 3.9 | 2.9 | 4.7 | 5.2 | | | | 1.8 |
| TF (tackfree, hour) | 1.2 | 1.0 | 0.5 | 1.0 | 1.5 | 2.0 | 2.5 | 0.5 | 0.5 | — | — | — | 5.0 |

*Days of exposure.

TABLE 4

| Aging conditions and measurement items | Ex. 8 | Ex. 9 | Ex. 10 | Ex. 11 | Ex. 7 |
| --- | --- | --- | --- | --- | --- |
| 35° C., 55% RH × 5 days | | | | | |
| 50% Modulus (kg/cm$^2$) | 5.9 | 5.3 | 1.5 | 0.6 | 3.0 |
| 100% Modulus (kg/cm$^2$) | — | — | 2.0 | 0.8 | 3.8 |
| 150% Modulus (kg/cm$^2$) | — | — | 2.3 | 1.0 | 4.0 |
| Breaking strength (kg/cm$^2$) | 6.1 | 5.5 | 2.8 | 1.8 | 5.6 |
| Elongation (%) | 56 | 60 | 340 | 470 | 380 |

Measurement temperature 20° C.

TABLE 5

| Aging conditions and measurement items | Ex. 7 | Comp. Ex. 4 |
| --- | --- | --- |
| 20° C., 55% RH × 3 days | | |
| 100% Modulus (kg/cm$^2$) | 4.6 | 2.4 |
| 200% Modulus (kg/cm$^2$) | 5.4 | 4.4 |
| 300% Modulus (kg/cm$^2$) | 6.1 | 6.5 |
| Breaking strength (kg/cm$^2$) | 10.4 | 14.8 |
| Elongation (%) | 550 | 850 |
| 20° C., 55% RH × 3 days + heating (90° C.) × 7 days | | |
| 100% Modulus (kg/cm$^2$) | 4.4 | 4.3 |

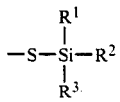
(I)

wherein $R^1$, $R^2$, and $R^3$ are selected from the group consisting of an alkyl group having 1 to 6 carbon atoms, a phenyl group, and a chloromethyl group, and (b) a polymer which is a polyester urethane polymer or a polyether urethane polymer having two or more isocyanate groups per molecule.

2. A one-part curing composition according to claim 1, wherein the compound (a) has two or more structural groups, per molecule, expressed by the general formula:

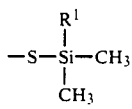
(II)

wherein, $R^1$ is selected from the group consisting of an alkyl group having 1 to 6 carbon atoms, a phenyl group, and a chloromethyl group.

3. A one-part curing composition according to claim 1, wherein the compound (a) has two or more structural groups, per molecule, expressed by:

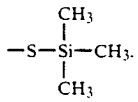
(II)

4. A one-part curing composition according to claim 1, wherein the compound (a) has a molecular weight of 200 to 10,000 and is liquid at 20° C.

5. A one-part curing composition according to claim 1, wherein the compound (a) has

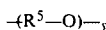

wherein $R^5$ is alkylene group having 2 or 3 carbon atoms and s is an integer from 1 to 50, at least in part of the skeleton.

6. A one-part curing composition according to claim 1, wherein the compound (a) has

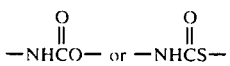

at least in part of the skeleton.

7. A one-part curing composition according to claim 1, wherein the compound (a) has

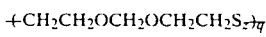

where q is an integer from 1 to 25 and z is an integer of from 1 4, with a mean value of about 2, at least in part of the skeleton.

8. A one-part curing composition according to claim 1, wherein the compound (a) has the following general formula:

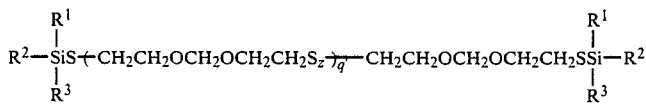

wherein, $R^1$, $R^2$, and $R^3$ are selected from the group consisting of an alkyl group having 1 or 2 carbon atoms, a phenyl group, and a chloromethyl group, q' is an integer from 0 to 25, and z is an integer from 1 to 4, the mean value of which is about 2.

9. A one-part curing composition according to claim 1, wherein the polymer (b) has a molecular weight of 500 to 20,000.

10. A one-part curing composition according to claim 1, wherein the polymer (b) is a reaction product of (1) an active hydrogen containing compound selected from the group of compounds consisting of hydroxyl-terminated polyesters, polyhydroxyl-polyalkyleneethers hydroxyl-terminated polyurethane polymers, polyvalent polythioethers, polyacetals, aliphatic polyols, aliphatic thiols, aromatic diamines, aliphatic diamines, 11. A one-part curing composition according to claim 1, wherein the molar ratio of the structural groups expressed by general formula (I) in the compound (a) to the isocyanate groups in polymer (b) is 0.3 to 2.0.

12. A one-part curing composition according to claim 1, which further comprises a catalyst selected from tertiary amines and organometallic compounds.

13. A one-part curing composition according to claim 1, wherein the compound (a) has a molecular weight of 300 to 3,000 and is liquid at 20° C.

14. A one-part curing composition according to claim 1, wherein the compound (a) is selected from the group consisting of compounds consisting of the following formulas:

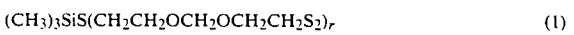
(1)

wherein r is an integer of from 0 to 10;

(2)

wherein $R^5$ and $R^6$ are alkylene groups with two or three carbon atoms and s is an integer from 0 to 50;

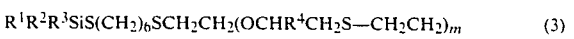
(3)

wherein m is an integer from 0 to 25 and $R^4$ is hydrogen or a methyl group;

(4) 

(5) 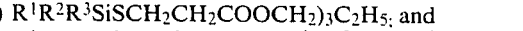; and (6) mixtures thereof, wherein $R^1$, $R^2$, and $R^3$ are defined as in claim 1.

15. A one-part curing composition according to claim 1, wherein the polymer (b) has a molecular weight of 2000 to 8000.

16. A one-part curing composition according to claim 1, wherein the molar ratio of the structural groups expressed by general formula (I) in the compound (a) to the isocyanate groups in polymer (b) is 0.8 to 1.2.

17. A one-part curing composition according to claim 1, further comprising a filler selected from the group consisting of calcium carbonate, carbon black, and titanium oxide; and a plasticizer selected from the group consisting of butylbenzyl phthalate and dioctyl phthalate.

18. A one-part curing composition according to claim 1, further comprising a powdered molecular sieve for enhancing storage stability.

19. A one-part curing composition according to claim 1, further comprising a reaction catalyst selected from the group consisting of triethylenediamine, triethylamine, pentamethylenediethylenetriamine, N,N-dimethylcyclohexylamine, N,N-dicyclohexylemethylamine, dibutyltin diacetate, dibutyltin dilaurate, dibutyltin dimalate, and lead octenate, wherein said reaction catalyst is present in an amount of 0.01 to 1.0 parts by weight per 100 parts by weight of the compound (a) and polymer (b).

20. A one-part curing composition according to claim 19, wherein said reaction catalyst is present in an amount of 0.1 to 0.3 parts by weight per 100 parts by weight of the compound (a) and polymer (b).

21. A one-part curing composition according to claim 1, further comprising an hydrolysis catalyst selected from the group consisting of triethylamine, tripropylamine, tributylamine, pyridine, N-methyl-2-pyrrolidone, dimethylaniline, benzyldimethylamine, hexamethylenetetramine, 2,4,6-trisdimethylaminomethylphenol, and diphenylguanidine, wherein said hydroysis catalyst is present in an amount of 0.01 to 3.0 parts by weight per 100 parts by weight of the compound (a).

22. A one-part curing composition according to claim 21, wherein said hydrolysis catalyst is selected from the group consisting of hexamethylenetetramine, 2,4,6-trisdimethylaminomethylphenol, and diphenolguanidine.

* * * * *